(12) United States Patent
Shinzawa

(10) Patent No.: US 6,941,929 B2
(45) Date of Patent: Sep. 13, 2005

(54) COMBUSTION CONTROL SYSTEM FOR INTERNAL COMBUSTION ENGINE

(75) Inventor: Motohiro Shinzawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/770,550

(22) Filed: Feb. 4, 2004

(65) Prior Publication Data

US 2004/0154591 A1 Aug. 12, 2004

(30) Foreign Application Priority Data

Feb. 10, 2003 (JP) ........................................ 2003-031833

(51) Int. Cl.$^7$ .......................... F02D 45/00; F02M 25/07; F02P 5/15
(52) U.S. Cl. .................. 123/357; 123/381; 123/406.55; 123/486; 123/568.21
(58) Field of Search ................................. 123/357, 381, 123/406.12, 406.19, 406.3, 406.32, 406.47, 406.48, 406.55, 478, 480, 486, 494, 568.21; 73/32 R, 116, 117.3, 118.1, 119 A

(56) References Cited

U.S. PATENT DOCUMENTS

| | | | | |
|---|---|---|---|---|
| 4,682,293 A | * | 7/1987 | Goldenberg et al. | 123/480 |
| 5,027,768 A | * | 7/1991 | Saegusa | 123/381 |
| 5,054,460 A | * | 10/1991 | Ogita | 123/568.21 |
| 5,327,872 A | * | 7/1994 | Morikawa | 123/514 |
| 5,495,840 A | * | 3/1996 | Ohtsuka et al. | 123/478 |
| 6,283,096 B1 | | 9/2001 | Kimura | |
| 2003/0205218 A1 | * | 11/2003 | McIntyre et al. | 123/494 |
| 2004/0000275 A1 | * | 1/2004 | McIntyre et al. | 123/1 A |
| 2004/0154386 A1 | * | 8/2004 | Shinzawa | 73/118.1 |

FOREIGN PATENT DOCUMENTS

| | | |
|---|---|---|
| JP | 3-45181 Y2 | 9/1991 |
| JP | 11-107820 A | 4/1999 |

* cited by examiner

Primary Examiner—Tony M. Argenbright
(74) Attorney, Agent, or Firm—Foley & Lardner LLP

(57) ABSTRACT

A combustion control system of an internal combustion engine is comprised of a specific gravity detecting section which detects a specific gravity of fuel used in the engine, and a combustion control section which controls combustion in the engine on the basis of the specific gravity.

10 Claims, 13 Drawing Sheets

COMBUSTION CONTROL SYSTEM FOR INTERNAL COMBUSTION ENGINE

BACKGROUND OF THE INVENTION

The present invention relates a combustion control system which properly controls a fuel injection timing, an ignition timing and an EGR (exhaust gas recirculation) according to a fuel property such as a center number or octane number of fuel using in an internal combustion engine.

Japanese Examined Utility Model Application No. 3-45181 discloses a cetane number sensor for detecting a fuel property of fuel used in an internal combustion engine. By determining a centane number of light oil actually used by means of the cetane number sensor, a proper fuel injection is executed according to the determined fuel property to stably operate the internal combustion engine.

A cetane number determination method employing this cetane number sensor is executed on the assumption that a viscosity and a center number of light oil have a proportional relationship. As a means for measuring a viscosity of light oil, there are provided a pendulum which sinks in light oil of a fuel tank by gravity and a sink time measuring mechanism which measures a sink time of the pendulum affected by viscosity. The viscosity of the light oil is determined from the sink time, and a cetane number of the light oil is determined by correcting the obtained viscosity in temperature.

Japanese Published Patent Application No. 11-107820 discloses a combustion control system of a diesel engine. This combustion control system comprises an in-cylinder pressure sensor for detecting an ignition timing, in order to vary the ignition timing or an EGR ratio when an actual ignition timing deviates from a target ignition timing due to dispersion of a cetane number of fuel in markets and the like. Consequently, this system is arranged such that the fuel property such as a centane number influences a difference between the actual ignition timing and the target ignition timing.

SUMMARY OF THE INVENTION

The cetane number determination method in the Japanese Examined Utility Model Application No. 3-45181 is executed on the presumption that a viscosity and a cetane number are in a proportional relationship such that the cetane number increases as the viscosity increases.

However, inventors of the present invention proved that it was difficult to accurately detect a cetane number from a viscosity. More specifically, the inventors has searched a relationship between the viscosity and the center number of light oil as shown in FIG. 5 and concluded that a correlation between the viscosity and the cetane number of light oil is low and rather has an inverse proportional relationship so that the cetane number decreases as the viscosity increases. Further, this method of the former related art requires to provide a complicated mechanism for measuring a viscosity measurement, and thereby limiting the design of the fuel tank and degrading the productivity of the system for this former method. Furthermore, since it is supposed that a friction of a viscosity measuring system in the fuel tank will be varied if the vehicle is put in an inclined state, it is difficult to accurately measure the viscosity by mean of this method.

On the other hand, since the combustion control system disclosed in Japanese Published Patent Application No. 11-107820 is arranged to determine a cetane number based on a difference between the actual ignition timing and the target ignition timing, it is necessary to comprise an expensive in-cylinder pressure sensor, such as a piezoresistance effect type pressure sensor. Further, since disturbances except for the cetane number also affect the difference of the actual and target ignition timings, it is difficult to accurately detect the cetane number only from this difference.

Inventors of the present invention have searched a relationship between a standard specific gravity (specific gravity at standard temperature 20° C.) and properties of fuel in markets. Herein, there is discussed the relationship between standard specific gravity and properties of fuel in markets with reference to graphs shown in FIGS. 2 through 6. FIGS. 2 through 4 show properties of light oil, and FIGS. 5 and 6 show properties of gasoline.

In case of light oil, as shown in FIG. 2, a cetane number is decreased in inverse proportion to the standard specific gravity (hereinafter, simply called a density). The reason thereof is that aromatics content having a benzene ring whose cetane number is small and whose evaporation property is low, increases in light oil as the specific density becomes greater as shown in FIG. 3. Further, it is general that aromatics tends to become heavy because aromatics is constructed by connecting straight chains and/or side chains to polycyclic structure. Accordingly, the viscosity tends to increase as the aromatics content increases. Since the viscosity increases in proportion to the increase of the specific density, the cetane number is rather decreased in inverse proportion to the viscosity as shown in FIG. 4.

On the other hand, in case of gasoline, as shown in FIG. 6, aromatics content increases as the density becomes greater as is similar to the tendency of light oil. As discussed above, the function of the cetane number is inverse to that of the octane number. Accordingly, the octane number becomes higher in gasoline as the density becomes higher as shown in FIG. 5.

It is therefore an object of the present invention to provide a combustion control system for an internal combustion engine, and more particularly to a combustion control system which properly controls a fuel injection timing, an ignition timing or a quantity of exhaust gas recirculation (EGR) according to a property of fuel in use, such as a cetane number or octane number.

An aspect of the present invention resides in a combustion control system which is for an internal combustion engine and which comprises a specific gravity detecting section that detects a specific gravity of fuel used in the engine; and a combustion control section that controls combustion in the engine on the basis of the specific gravity.

Another aspect of the present invention resides in a method of controlling combustion in an internal combustion engine, which method comprises an operation of detecting a specific gravity of fuel used in the engine, and an operation of controlling the combustion in the engine on the basis of the specific gravity.

The other objects and features of this invention will become understood from the following description with reference to the accompanying drawings.

DETAILED DESCRIPTION OF THE INVENTION

There is discussed a preferred embodiment of a combustion control system for an internal combustion engine in accordance with the present invention with reference to the drawings.

Figure 1:
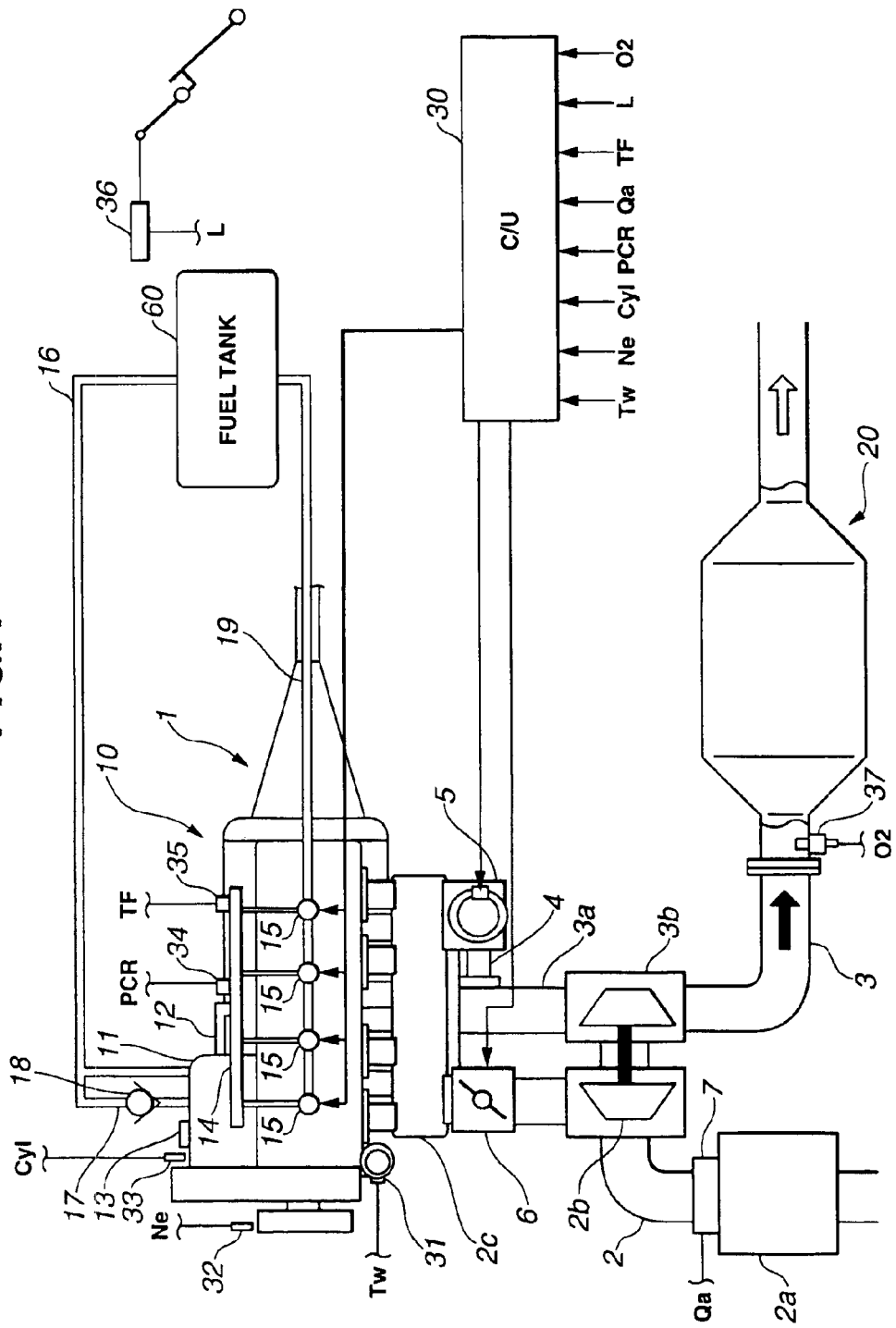
FIG. 1 is a schematic view showing an engine system which comprises a fuel property determination system according to the present invention.
Figure 2:
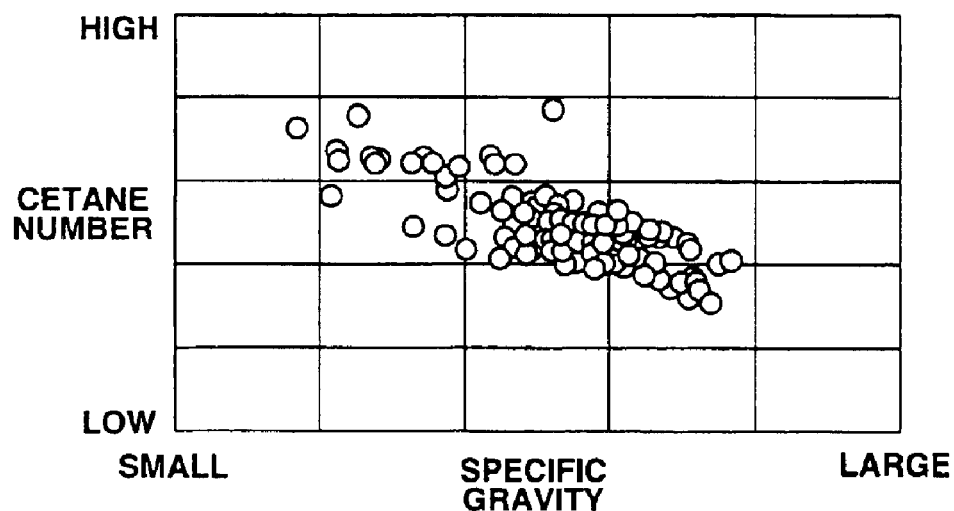
FIG. 2 is a graph showing a relationship between a specific gravity and a cetane number of light oil.
Figure 3:
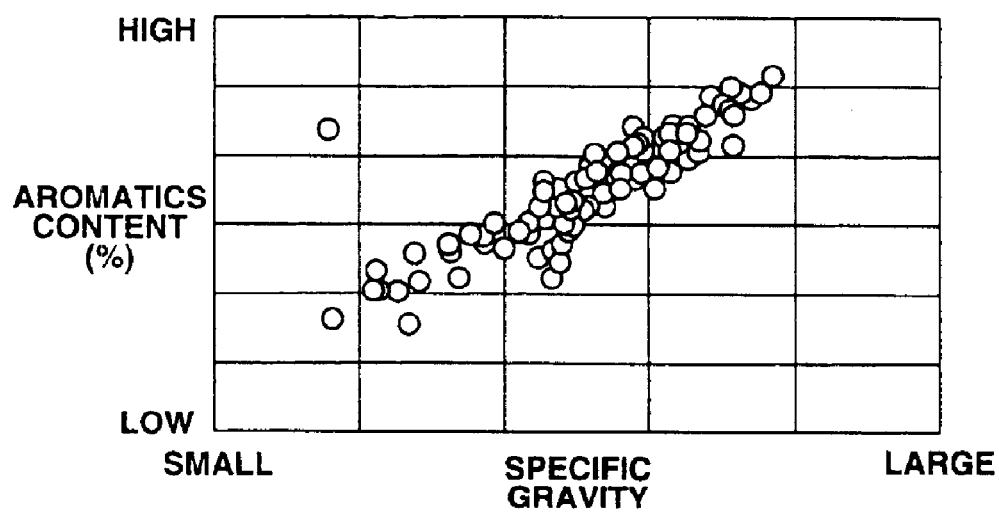
FIG. 3 is a graph showing a relationship between the specific gravity and an aromatics content of light oil.
Figure 4:
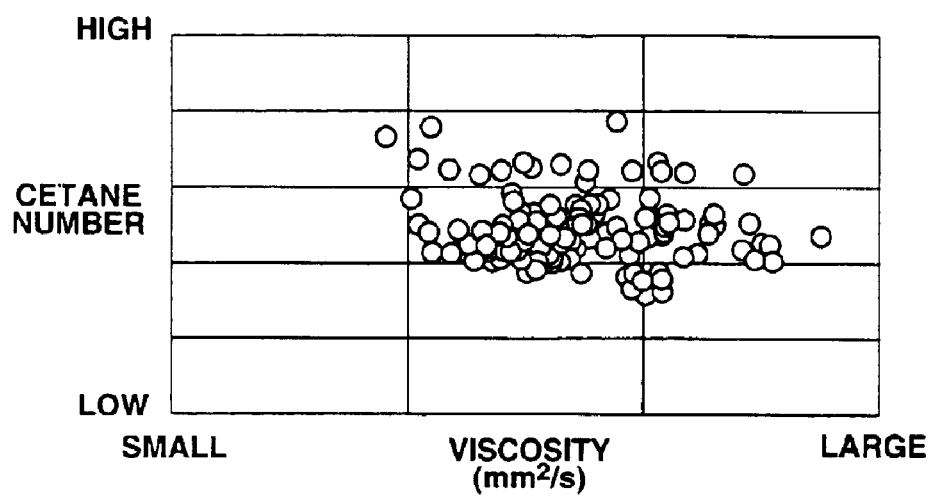
FIG. 4 is a graph showing a relationship between a viscosity and the cetane number of light oil.
Figure 5:
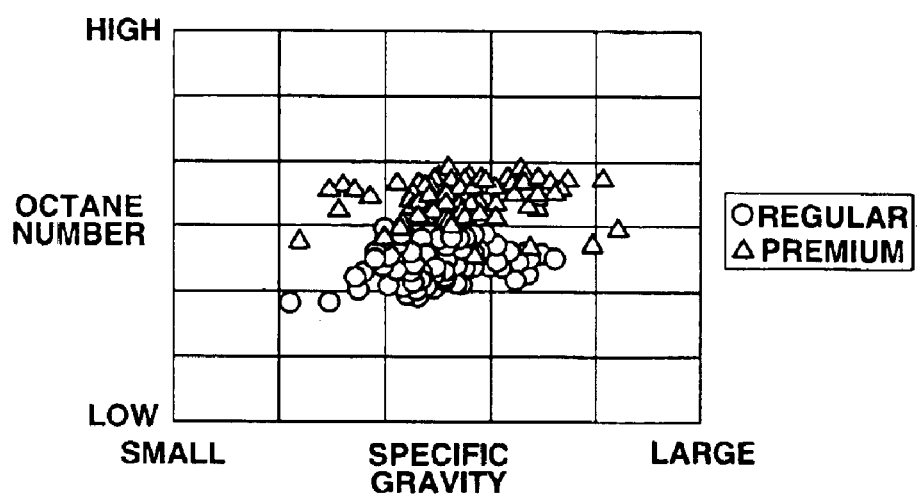
FIG. 5 is a graph showing a relationship between a specific gravity and an octane number of gasoline.
Figure 6:
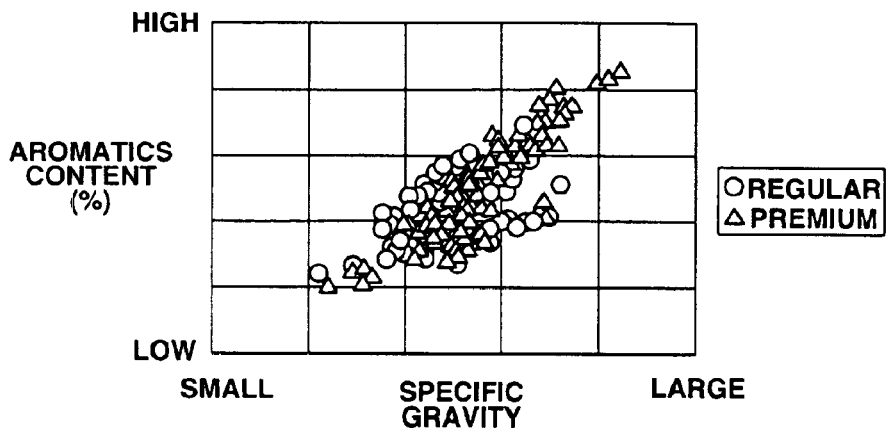
FIG. 6 is a graph showing a relationship between the specific gravity and an aromatics content of gasoline.

FIG. 1 shows an engine system to which the combustion control system according to the present invention is applied. The internal combustion engine of this engine system is a diesel engine 1 which uses light oil as fuel.

As shown in FIG. 1, an exhaust gas passage 3 of diesel engine 1 is connected to an exhaust side of engine 1. More specifically, an exhaust outlet passage 3a is directly connected to exhaust ports of engine 1. Exhaust outlet passage 3a performs an upstream portion of an exhaust passage 3 of engine 1, and its downstream side is connected to a turbine chamber for a turbine 3b of a turbocharger. An exhaust gas processing apparatus, which includes an oxidation catalyst and a NOx catalyst, is connected to a downstream side of the turbine chamber in series. An air/fuel ratio sensor 37 functioning as actual air/fuel ratio detecting means is disposed at an inlet port of casing 20. This air/fuel ratio sensor 37 is of a type which detects an oxygen density in exhaust gases using an oxygen-ion conductive solid electrolyte and which obtains the air/fuel ratio from the detected oxygen density.

An EGR passage 4 is disposed between an intake collector 2c of an intake passage 2 and exhaust outlet passage 3a to recirculate a part of exhaust gases from exhaust outlet passage 3a to intake corrector 2c. An EGR valve 5 is disposed in EGR passage 4. An opening of EGR valve 5 is continuously variable according to an operation of a stepping motor connected to EGR valve 5.

An air cleaner 2a is installed at an upstream side of intake passage 2, and an airflow meter 7 functioning as intake air quantity detecting means is connected to an outlet of air cleaner 2a. A compressor 2b of the turbocharger is disposed at an downstream of airflow meter 7. An intake throttle valve 6, which is opened and closed by an actuator such as a stepping motor, is disposed between compressor 2b and intake collector 2c.

A fuel supply line of engine 1 comprises a fuel tank 60 for storing light oil of diesel engine fuel, a fuel supply passage 16 for supplying the fuel to a fuel injection apparatus 10 of engine 1 and a fuel return passage 19 for returning return-fuel (spill fuel) from fuel injection apparatus 10 to fuel tank 60.

Fuel injection apparatus 10 of engine 1 is a common-rail type fuel injection apparatus, and mainly comprises a supply pump 11, a common-rail (accumulator) 14, and a fuel injector 15 provided for each cylinder of engine 1. Fuel pressurized by supply pump 11 is supplied to common-rail 14 through fuel supply passage 12 and is temporally stored in common-rail 14. Then, the pressurized fuel in common-rail 14 is distributed to each fuel injector 15 for each cylinder of engine 1.

A pressure sensor 34 for detecting a fuel pressure in common-rail 14 and a temperature sensor 35 for detecting a temperature of the fuel in common-rail 14 are attached to common-rail 14. A part of fuel discharged from supply pump 11 is returned to fuel supply passage 16 through an overflow passage 17 provided with a one-way valve 18 to control the fuel pressure in common-rail 14. More specifically, there is provided a pressure control valve 13 for varying a passage cross-sectional area of overflow passage 17. An engine control unit 30 outputs a duty signal to pressure control valve 13 to vary the passage cross-sectional area of overflow passage 17. By this cross-sectional area varying operation, an actual fuel discharge quantity from supply pump 11 to common-rail 14 is controlled, and therefore the fuel pressure in common-rail 14 is controlled.

Fuel injector 15 is an electronic injector which is opened and closed in response to ON-OFF signal outputted from engine control unit 30. In response to ON signal, fuel injector 15 injects fuel into a combustion chamber, and in response to OFF signal, fuel injector 15 stops the fuel injection. A fuel injection quantity injected from fuel injector 15 is increased as a period of outputting ON signal to fuel injector 15 is elongated, and the fuel injection quantity is increased as the fuel pressure in common-rail 14 is increased.

Engine control unit 30 receives an intake air quantity indicative signal Qa from airflow meter 7, a cooling water temperature indicative signal Tw from a water temperature sensor 31, a crank angle signal indicative of an engine speed (revolution speed of engine 1) Ne from a crank angle signal 32, a cylinder distinguish signal Cyl from a cylinder distinguishing crank angle sensor 33, a common-rail pressure indicative signal PCR from pressure sensor 34, a fuel temperature indicative signal TF from temperature sensor 35 for detecting fuel temperature, a accelerator opening signal indicative of load L from an accelerator opening sensor 36 for detecting a depression quantity of an accelerator pedal corresponding to a load to be generated, and a signal O2 indicative of the oxygen density from air/fuel ratio sensor 37. Water temperature sensor 31 is attached to a proper position of engine 1 and detects cooling water temperature Tw which representatively shows a temperature of engine 1.

Figure 11:
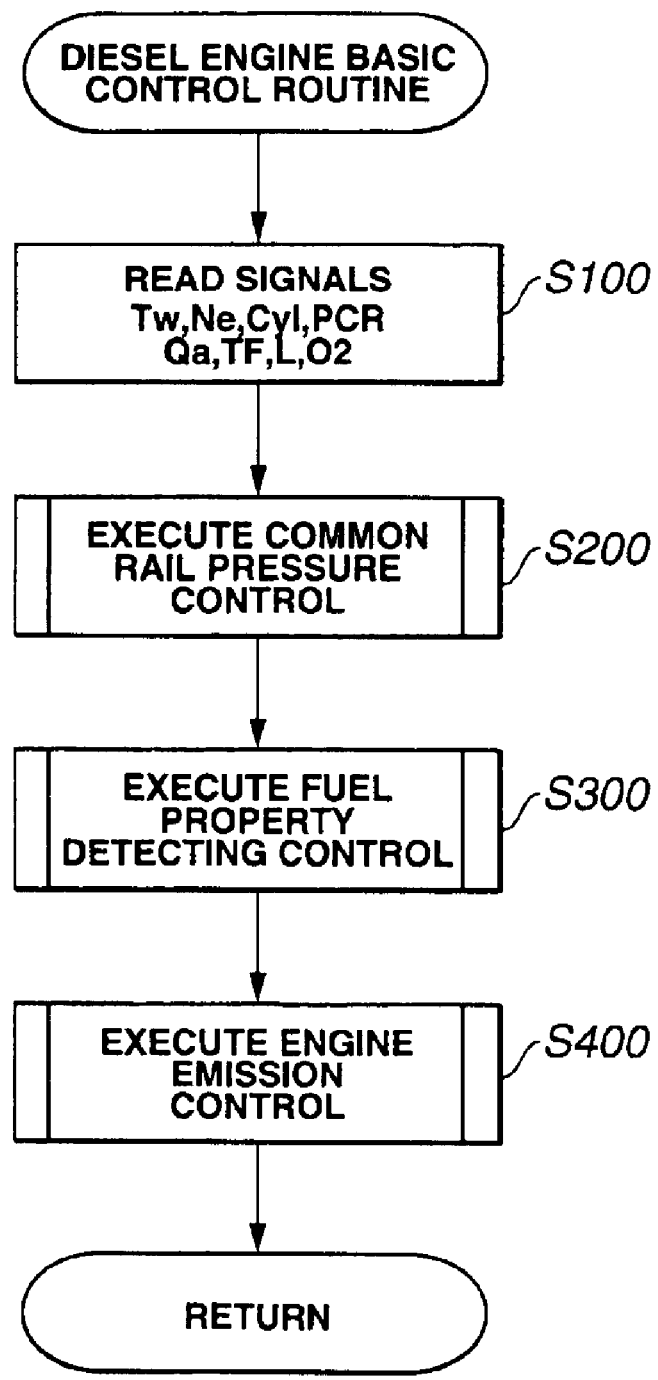
FIG. 11 is a flowchart showing a basic control routine of a diesel engine of the engine system.

Subsequently, there is discussed a control executed by engine control unit 30 with reference to flowcharts shown in FIGS. 11 through 15. This control includes a fuel property determination processing according to the present invention. FIG. 11 shows a basic control routine for controlling diesel engine 1.

At step S100 in FIG. 11 control unit 30 reads water temperature indicative signal Tw, engine speed indicative signal Ne, cylinder distinguishing signal Cyl, common-rail pressure indicative signal PCR, intake air quantity indicative signal Qa, fuel temperature indicative signal TF, accelerator opening indicative signal L, and oxygen density indicative signal O2 from sensors 31, 32, 33, 34, 35, 36, 37 and 7, respectively.

At step 200 control unit 30 executes a common-rail pressure control. More specifically, in the common-rail pressure control, control unit 30 retrieves a target standard pressure PCR0 of common-rail 14 from a predetermined map previously stored in a ROM of control unit 30, and executes a feedback control of a pressure control valve 13 so as to bring the actual common-rail pressure closer to target standard pressure PCR0.

At step 300 control unit 30 executes a fuel property detecting control. At step 400 subsequent to the execution of step S300 control unit 30 executes an engine emission control.

Figure 12:
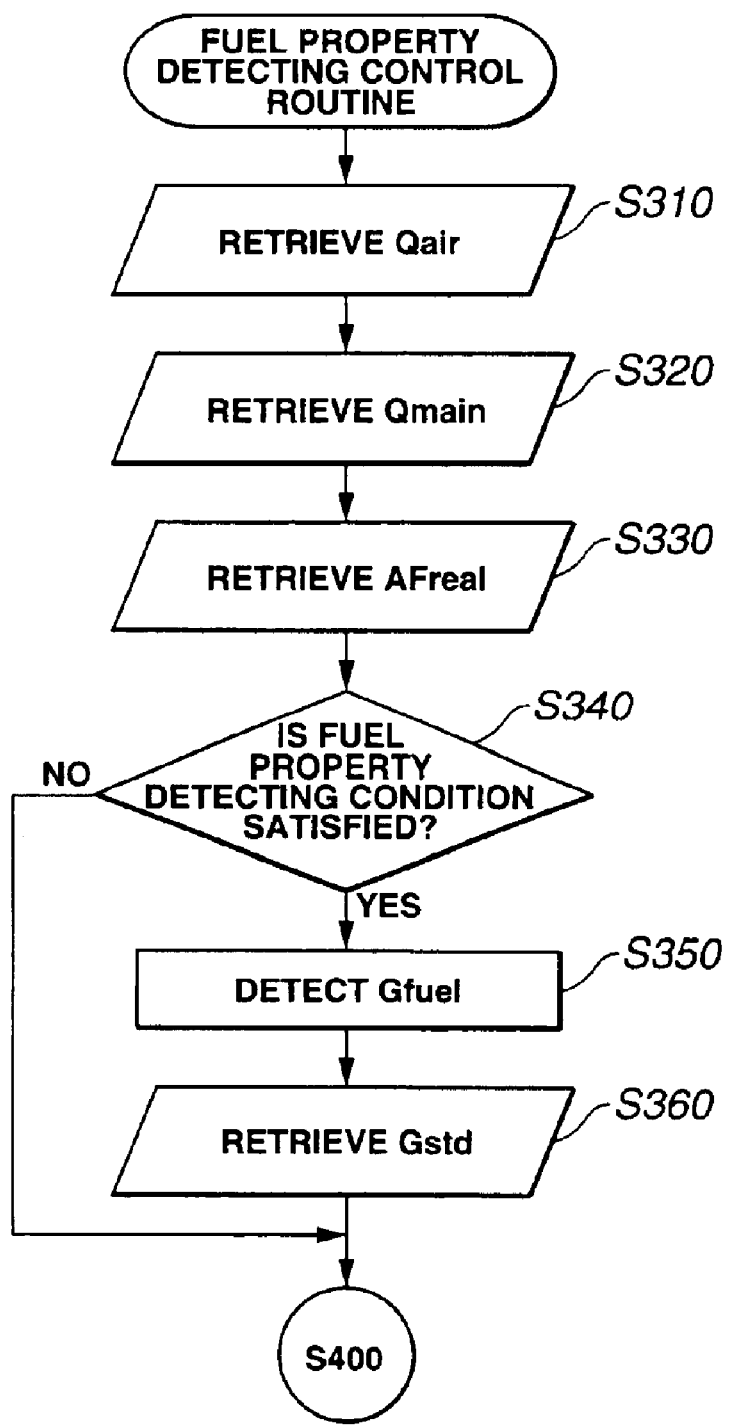
FIG. 12 is a flowchart showing a control routine for detecting a fuel specific gravity.

Referring to a flowchart of FIG. 12, there is discussed the subroutine of the fuel property (specific gravity) detecting control executed at step S300 in detail. By executing this subroutine, control unit 30 can finely detect the property of fuel used in engine 1.

At step S310 control unit 30 retrieves signal Qa of airflow meter 7 from table data which represents a relationship between signal Qa of airflow meter and an intake air quantity Qair while employing signal Qa as a parameter, and which has been previously stored in ROM of control unit 30.

At step S320 control unit 30 retrieves a main fuel injection quantity Qmain from a predetermined map which represents a relationship among main fuel injection quantity Qmain, engine speed Ne and load L while employing engine speed Ne and load L as parameters, and which has been previously stored in ROM of control unit 30. Main fuel injection quantity Qmain may be obtained by other method. For example, it may be obtained by retrieving a fuel injection period Mperiod of a fuel injection system from a map which represents a relationship among fuel injection period Mperiod, engine speed Ne and load L while employing engine speed Ne and load L as parameters, and which has been previously stored in ROM of control unit 30. Further, control unit 30 retrieves main fuel injection quantity Qmain from a map which represents a relationship among main fuel injection quantity Qmain, fuel injection period Mperiod and common-rail pressure PCR while employing fuel injection period Mperiod and common-rail pressure PCR as parameters, and which has been previously stored in ROM of control unit 30.

At step S330 control unit 30 retrieves an actual air/fuel ratio AFreal from table data which represents a relationship between actual air/fuel ratio AFreal and signal O2 outputted from air/fuel ratio sensor 37 and which has been previously stored in ROM of control unit 30.

At step S340 control unit 30 determines whether or not a fuel property detecting condition is satisfied. For example, although an internal combustion engine for an automotive vehicle is generally provided with an exhaust gas recirculation system including an EGR valve in order to reduce NOx in exhaust gases, it is necessary to correct the quantity of the exhaust gas recirculation to accurately obtain the actual air/fuel ratio since the exhaust air/fuel ratio is shifted to a rich side when the exhaust gases are recirculated according to the engine operating condition. Accordingly, there is a possibility that the detection accuracy of the actual air/fuel ratio is degraded by the correction. It is preferable that outputting the detection command for detecting the actual air/fuel ratio is limited only when the exhaust gas recirculation is stopped. Accordingly, one of the fuel property detecting condition is a condition when the exhaust gas recirculation is stopped.

When the determination at step S340 is negative, that is, when the fuel property detecting condition is not satisfied, this subroutine is terminated, and therefore the routine proceeds to step S400 in FIG. 11. When the determination at step S340 is affirmative, that is, when the fuel property detecting condition is satisfied, the program proceeds to step S350.

At step S350 control unit 30 obtains an actual fuel supply weight Gmain on the basis of intake air quantity Qair obtained at step S310 and actual air/fuel ratio AFreal obtained at step S330. More specifically, control unit 30 calculates actual fuel supply weight Gmain by dividing intake air quantity Qair by actual air/fuel ratio AFreal (Gmain=Qair÷AFreal). Further, control unit 30 obtains an actual specific gravity Gfuel on the basis of actual fuel supply weight Gmain and main fuel injection quantity Qmain obtained at step S320. More specifically, control unit 30 calculates actual specific gravity Gfuel by dividing actual fuel supply weight Gmain by main fuel injection quantity Qmain (Gfuel=Gmain÷Qmain).

At step S360 control unit 30 obtains a standard specific gravity Gstd which is a specific gravity at a standard temperature 20° C. More specifically, control unit 30 retrieves standard specific gravity Gstd from a map which represents a relationship among standard specific gravity Gstd, actual specific gravity Gfuel and fuel temperature TF while employing actual specific gravity Gfuel and fuel temperature TF as parameters, and which has been previously stored in ROM of control unit 30. Then, the routine proceeds to step S400 in FIG. 11.

Subsequently, there is briefly discussed a subroutine of the engine emission control executed at step S400 in FIG. 11, with reference to the flowchart shown in FIG. 13. Herein, in order to ensure a desired (determined) engine exhaust emission performance, the fuel injection timing control is executed at step S410, the EGR (exhaust recirculation gas) control is executed at step S420, and the exhaust post-processing control are executed at step S430. Although the engine emission control routine shown in FIG. 13 has been shown and described as to a diesel engine, it is applicable to a gasoline engine by replacing the injection timing control at step S410 with an ignition timing control for the gasoline engine. Such a control routine is discussed later.

Figure 14:
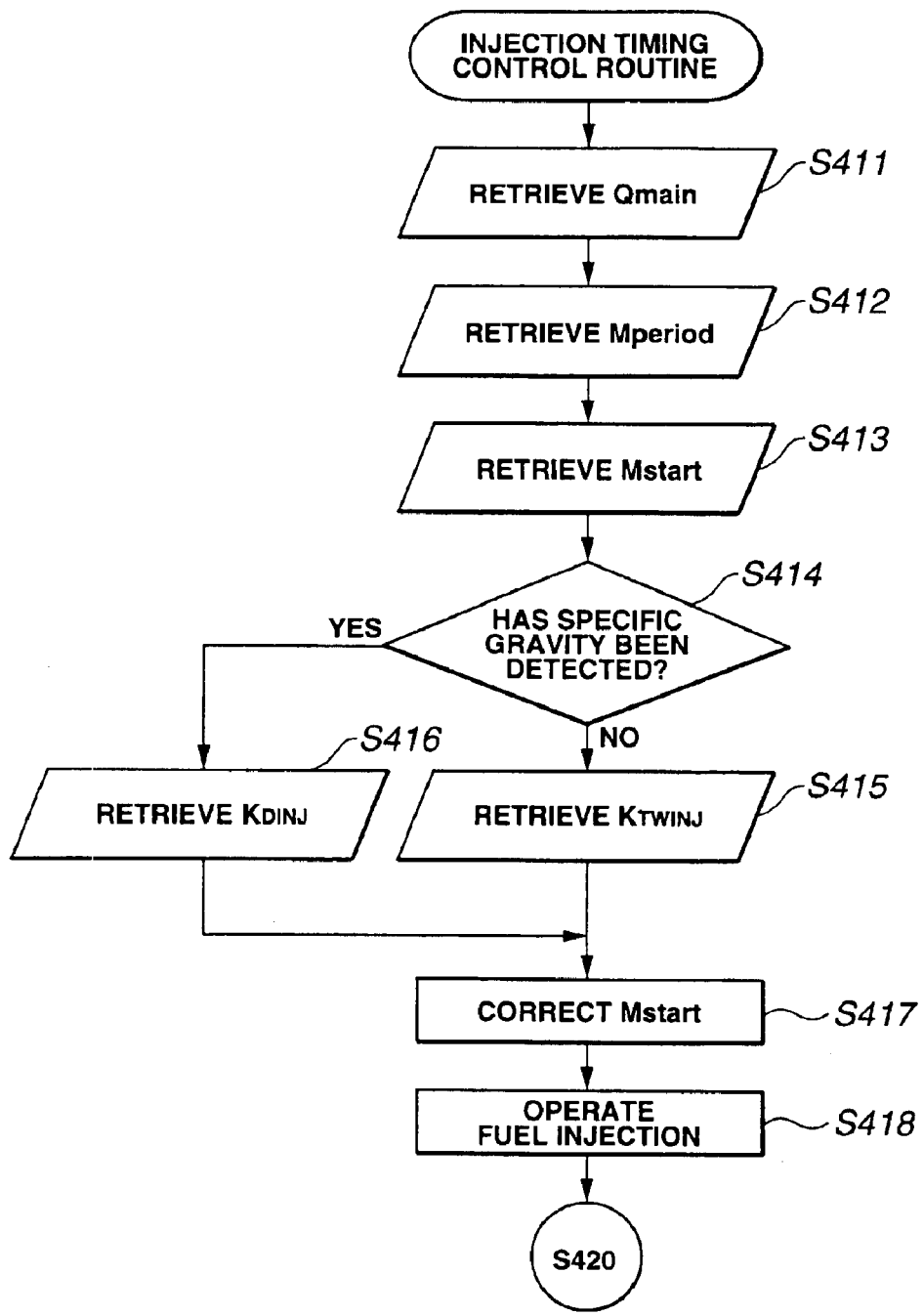
FIG. 14 is a flowchart showing an injection timing control routine.

FIG. 14 shows a subroutine of the injection timing control executed at step S410. At step S411 in FIG. 14, control unit 30 retrieves main fuel injection quantity Qmain from a predetermined map which represents a relationship among main fuel injection quantity Qmain, engine speed Ne and load L employing engine speed Ne and load L as parameters, and which has been previously stored in ROM of control unit 30.

At step S412 control unit 30 retrieves main injection period Mperiod for a predetermined map which represents a relationship among main injection period Mperiod, main fuel injection quantity Qmain and common-rail pressure PCR while employing main fuel injection quantity Qmain and common-rail pressure PCR as parameters, and which has been stored in ROM of control unit 30.

Figure 7:
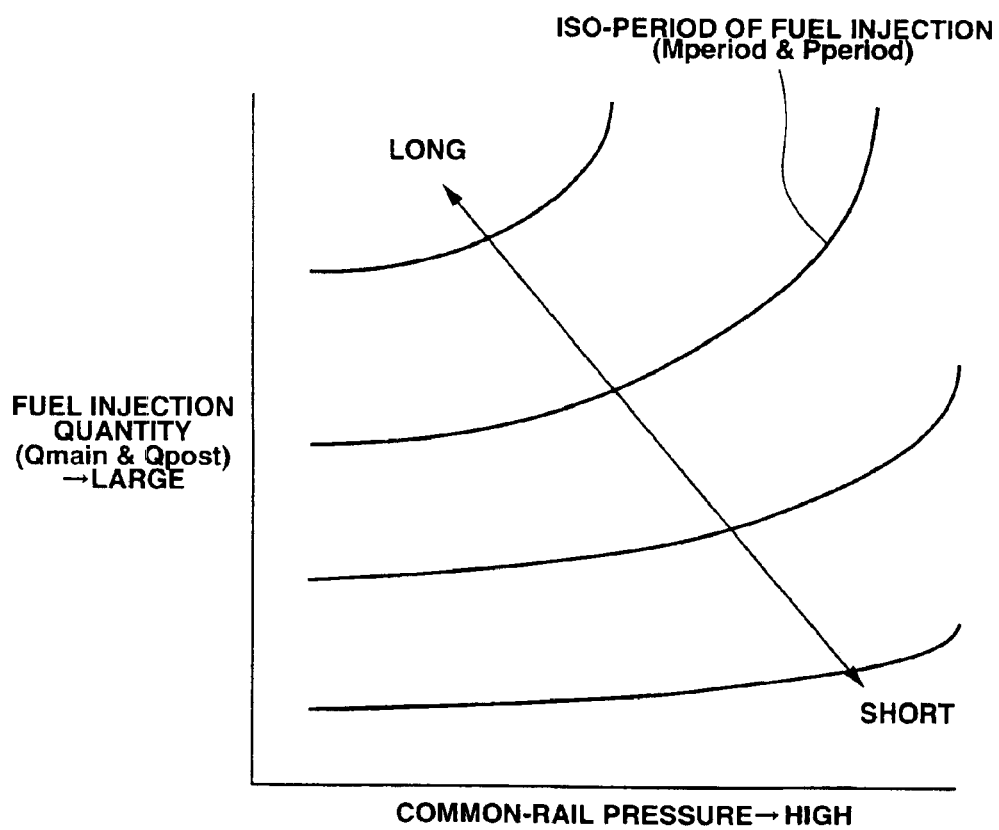
FIG. 7 is a graph showing a relationship among a fuel injection quantity, a common-rail pressure and a fuel injection period.

Herein, main injection period Mperiod is set to be varied by millisecond. As shown in FIG. 7, main injection period Mperiod is shortened as common-rail pressure PCR is increased on the presumption that main fuel injection quantity Qmain is constant. Further, main injection period Mperiod is elongated as main fuel injection quantity Qmain is increased on the presumption that common-rail pressure PCR is constant.

At step S413 control unit 30 retrieves a main injection start timing Mstart, which is a standard fuel injection timing, from a predetermined map which represents a relationship among main injection start timing Mstart, engine speed Ne and main fuel injection quantity Qmain while employing engine speed Ne and main fuel injection quantity Qmain as parameters, and which has been previously stored in ROM of control unit 30.

At step S414 control unit 30 determines whether or not a specific gravity of fuel actually used in engine 1 has been detected. When the determination at step S414 is negative, that is, when the detection has not been yet executed, the program proceeds to step S415 wherein control unit 30 retrieves fuel injection correction coefficient K$_{TWINJ}$ from a predetermined map which has been stored in ROM of control unit 30 as employing a cooling water temperature as a parameter. Fuel injection timing correction coefficient K$_{TWINJ}$ determined according to the cooling water temperature is basically set such that the injection timing is advanced as the cooling water temperature is lower.

At step S417 subsequent to the execution of step S415, control unit 30 corrects main injection start timing Mstart by multiplying main injection start timing main injection start timing by injection timing correction coefficient K$_{TWJNJ}$ (Mstart←Mstart×K$_{TWINJ}$).

At step S418 control unit 30 controls each fuel injector 15 to execute a main injection for a period Mperiod starting from main injection start timing Mstart, on the basis of the crank angle signal detected by crank angle sensor 32 for detecting the crank angle and cylinder distinguishing signal Cyl of crank angle sensor 33 for cylinder distinguishing. This enables each fuel injector 15 to properly supply main fuel injection quantity Qmain.

Although the subroutine in FIG. 14 has been shown and described such that the correction as to the cooling water temperature is executed by multiplying the correcting coefficient, the invention is not limited to this and may be arranged such that a fuel injection timing correcting value is obtained based on the cooling water temperature, and the corrected main injection start timing is obtained by adding the injection timing correction value to main injection start timing Mstart.

On the other hand, when the determination at step S414 is affirmative, that is, when the detection of the specific gravity has been already executed, the program proceeds to step S416 wherein control unit 30 retrieves fuel injection correction coefficient K$_{DINJ}$ from a predetermined map which has been stored in ROM of control unit 30 as employing the cooling water temperature and the fuel specific gravity as parameters.

At step S417 subsequent to the execution of step S416, control unit 30 corrects main injection start timing Mstart by multiplying main injection start timing Mstart by fuel injection correction coefficient K$_{DINJ}$ (Mstart←Mstart×K$_{DINJ}$).

Figure 8:
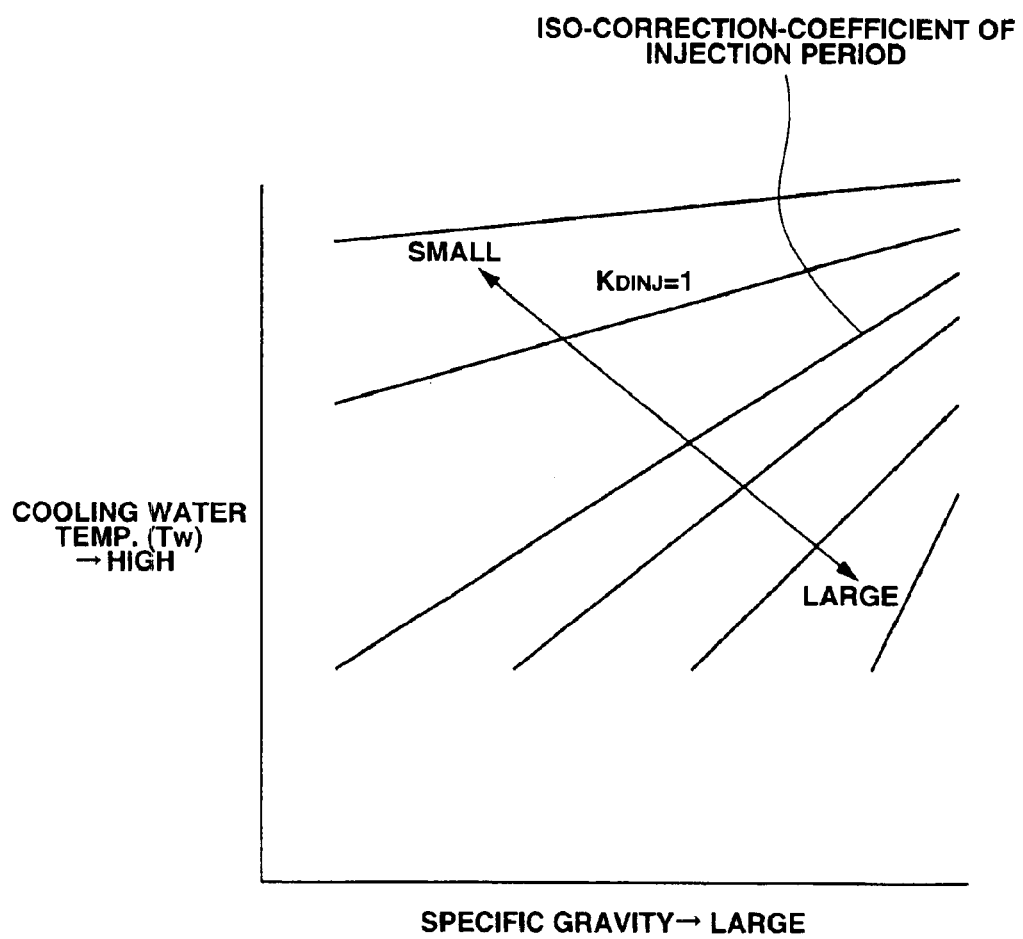
FIG. 8 is a graph showing a relationship among a fuel injection timing correction coefficient, the specific gravity of light oil and a cooling water temperature of an engine.

Herein, it is preferable that injection timing correction coefficient K$_{DINJ}$ determined from the cooling water temperature Tw and the fuel specific gravity is set such that the injection timing is advance as the cooling water temperature is lower or as the specific gravity is increased as shown in FIG. 8. By this preferable arrangement of the injection timing correction coefficient, the engine start performance is improved and the fuel consumption and the emission (particularly HC) under a warming up period are improved.

Although the program in FIG. 14 has been shown and described such that the correction as to the cooling water temperature Tw and the specific gravity is executed by multiplying the correcting coefficient for the cooling water temperature and the specific gravity, the invention is not limited to this and may be arranged such that a fuel injection timing correcting value is obtained based on the cooling water temperature and the fuel specific gravity, and the corrected main injection start timing is obtained by adding the injection timing correction value to main injection start timing Mstart.

Subsequently, there is discussed a subroutine for the EGR control executed at step S420 in FIG. 14. At step S421 of this EGR control routine, control unit 30 retrieves a main injection quantity Qmain from a map which represents a relationship among main injection quantity Qmain, engine speed Ne and load L while employing engine speed Ne and load L as parameters, and which has been previously stored in ROM of control unit 30.

At step S422 subsequent to the execution of step S421, control unit 30 retrieves a throttle valve drive signal THduty indicative of an opening of throttle valve 6 from a map which represents a relationship among throttle valve drive signal THduty, main injection quantity Qmain and engine speed Ne while employing main injection quantity Qmain and engine speed Ne as parameters, and which has been previously stored in ROM of control unit 30. It is preferable that the opening of throttle valve 6 increases as load L of engine 1 becomes higher and/or as engine speed Ne becomes higher.

At step S423 control unit 30 retrieves an EGR drive signal EGRduty indicative of an opening of EGR valve 5, which is a standard EGR control signal, from a map which represents a relationship among EGR valve drive signal EGRduty, main injection quantity Qmain and engine speed Ne while employing main injection quantity Qmain and engine speed Ne as parameters, and which has been previously stored in ROM of control unit 30.

At step S424 control unit 30 determines whether or not the specific gravity of fuel used in engine 1 has been detected. When the determination at step S424 is negative, that is, when the specific gravity has not been detected, the program proceeds to step S425 wherein control unit 30 retrieves a correction coefficient K$_{TWTH}$ of throttle valve drive signal THduty and a correction coefficient K$_{TWEGR}$ of EGR valve drive signal EGRduty respectively from a throttle correction map and an EGR correction map which respectively represent a relationship between correction coefficient K$_{TWTH}$ and cooling water temperature Tw and a relationship between correction coefficient K$_{TWEGR}$ and cooling water temperature Tw while employing cooling water temperature Tw as a parameter, and which have been previously stored in ROM of control unit 30. Herein, it is preferable that correction coefficient K$_{TWTH}$ is set such that the degree of closing throttle valve 6 is weakened as cooling water temperature Tw becomes lower. Further it is preferable that correction coefficient K$_{TWEGR}$ is set such that the opening of EGR valve 5 is decreased to decrease the quantity of EGR as cooling water temperature Tw becomes lower.

At step S427 subsequent to the execution of step S424, control unit 30 corrects throttle valve drive signal THduty by multiplying throttle valve drive signal THduty by correction coefficient KTWTH (THduty←THduty×KTWTH), and corrects EGR valve drive signal EGRduty by multiplying EGR valve drive signal EGRduty by correction coefficient KTWEGR (EGRduty←EGRduty×KTWEGR). Although the embodiment according to the present invention has been shown and described such that the correction according to the cooling water temperature is executed by multiplying the respective signals by the respective correction coefficients, it will be understood that the correction thereof may be executed by obtaining the respective correction values based on the cooling water temperature and adding the obtained correction values to the respective drive signals THduty and EGRduty.

At step S428 subsequent to the execution of step S427, control unit 30 operates throttle valve 6 and EGR valve 5 based on drive signals THduty and EGRduty, respectively.

Figure 9:
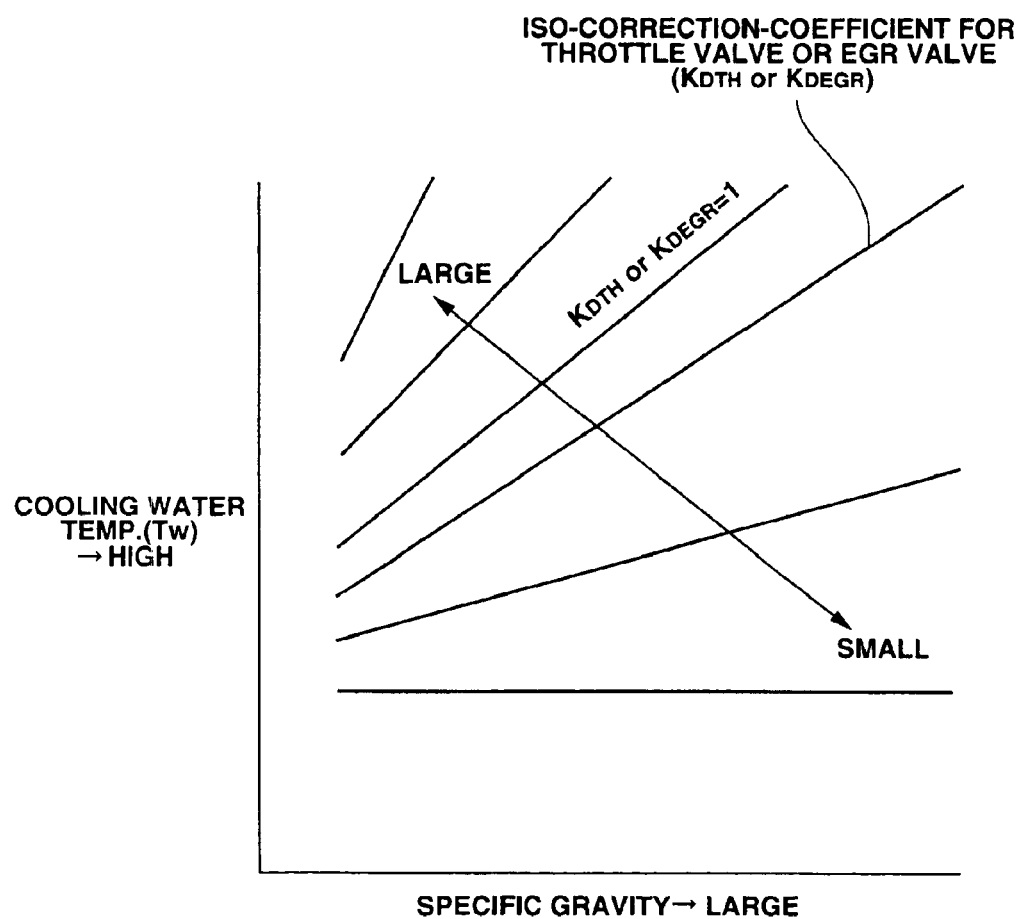
FIG. 9 is a graph showing a relationship among a throttle valve correction coefficient, the specific gravity of light oil and the cooling water temperature.
Figure 15:
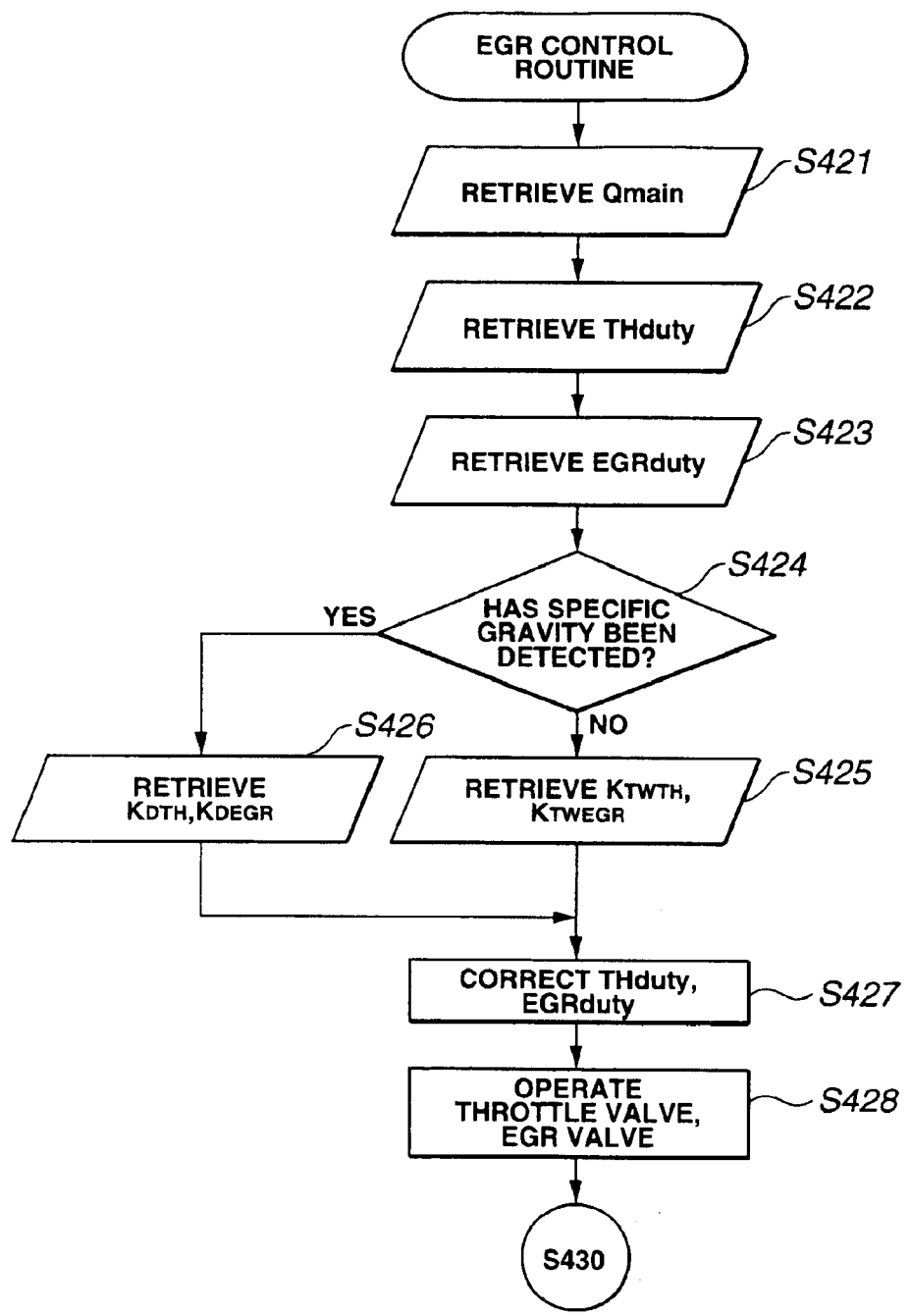
FIG. 15 is a flowchart showing an EGR control routine.

On the other hand, when the determination at step S424 is affirmative, that is, when the specific gravity of fuel has been detected, the program in FIG. 15 proceeds to step S426 wherein control unit 30 retrieves a correction coefficient KDTH of throttle valve drive signal THduty and a correction coefficient KDEGR of EGR valve drive signal EGRduty respectively from a throttle correction map and an EGR correction map which respectively represent a relationship among correction coefficient KDTH, cooling water temperature Tw and specific gravity and a relationship among correction coefficient KDEGR and cooling water temperature Tw and specific gravity while employing cooling water temperature Tw and specific gravity as parameters, and which have been previously stored in ROM of control unit 30. Herein, it is preferable that correction coefficient KDTH is set such that the degree of closing throttle valve 6 is weakened as the specific gravity increases and/or as cooling water temperature Tw becomes lower, as shown in FIG. 9. Further it is preferable that correction coefficient KDEGR is set such that the opening of EGR valve 5 is decreased to decrease the quantity of EGR as the specific gravity increases and/or as cooling water temperature Tw becomes lower, as shown in FIG. 9. By this arrangement of the correction coefficients, it becomes possible to suitably execute the EGR control adapted to the engine temperature and the fuel property. There is a possibility that the quantity of the EGR is set at zero as a result of this correction.

Although the embodiment according to the present invention has been shown and described such that the correction according to the cooling water temperature is executed by multiplying the respective signals by the respective correction coefficients, it will be understood that the correction thereof may be executed by obtaining the respective correction values based on the cooling water temperature and the specific gravity and by adding the obtained correction values to the drive signals THduty and EGRduty, respectively.

Figure 13:
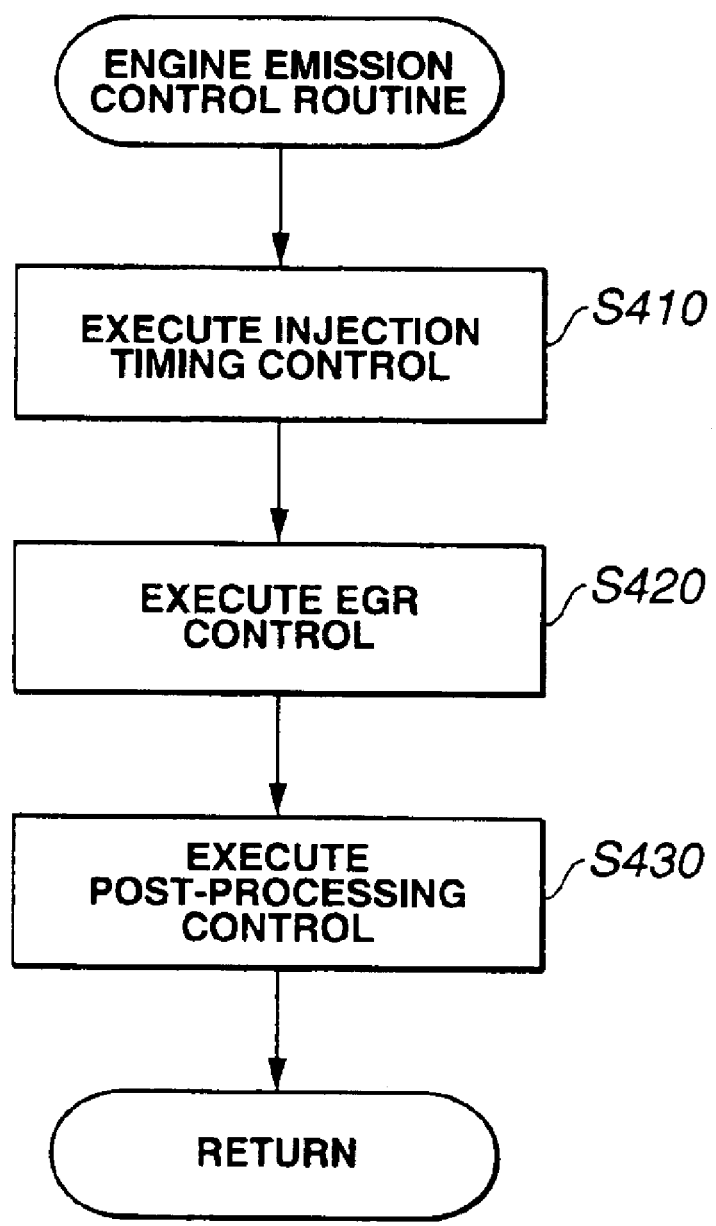
FIG. 13 is a flowchart showing an emission control routine of the engine.

At step S430 in FIG. 13, the exhaust post-processing control is executed. More specifically, there is provided NOx trap catalyst, which absorbs NOx when the air/fuel ratio of exhaust gases to the catalyst is lean and desorbs NOx when the oxygen density of the exhaust gases is lowered, in casing 20. Further, when the NOx trap catalyst is recovered, the reinforcement of closing throttle valve 6 (decreasing the opening of throttle valve 6), the reinforcement of closing EGR valve 5, and a post-injection which is a fuel injection of a small quantity of fuel after the main injection was executed, are executed alone or in combination with them, so that the air/fuel ratio of the exhaust gases of engine 1 is put into rich in order to execute the NOx recovery operation.

With the thus arranged combustion control system of diesel engine 1 in accordance with the present invention, the following advantages are derived.

(1) By advancing the injection timing as the specific gravity of fuel becomes greater, it becomes possible to suitably control the ignition timing according to the cetane number. When the cetane number becomes lower as the specific gravity of fuel becomes larger, the ignition property and the combustion property are degraded as the cetane number becomes lower. More specifically, a period from the injection to the firing is elongated due to these degrading, and the combustion after firing becomes slower. That is, there is a tendency that the combustion period is elongated by the lowering of the cetane number. As a result, in case of the fuel having low cetane number, unburned components such as HC, CO and PM including dry shoot and SOF increase as compared with a case of the standard fuel, and thereby degrading fuel consumption. Therefore, the embodiment according to the present invention is arranged to advance the ignition timing so as to suppress this degradation of fuel consumption. This arrangement enables the firing of fuel to be advanced so as to be fired at a timing when the temperature at a compression end is high, and thereby preventing the combustion from being degraded by the lowering of the cetane number.

(2) By decreasing the quantity of the EGR to a small quantity or zero, it becomes possible to suitably execute the EGR control according to the cetane number of fuel. The EGR of recirculating inactive gases into cylinders of engine slows down the combustion speed starting from the firing of fuel. Therefore the combustion temperature is lowered and the generation of NOx is decreased thereby. Since the temperature in cylinders tends to rise by the execution of the EGR, the firing property tends to rather increase thereby. Since the slow-down of the combustion speed is also achieved by the execution of the EGR, the execution of the EGR in case of fuel having low cetane number increases unburned components such as HC, CO and smokes, and thereby degrading fuel consumption. Therefore, the embodiment according to the present invention is arranged to decreasingly correct the quantity of EGR to compensate for the slow-down of combustion. This arrangement suppresses the increase of the unburned components of fuel and the degradation of fuel consumption.

(3) Since the embodiment according to the present invention achieves the injection timing control and the EGR control adapted to the fuel property while commonly employing sensors and functions of the diesel engine, the production cost of this system according to the present invention is largely suppressed.

Although the embodiment according to the present invention has been shown and described such that standard specific gravity Gstd is obtained by obtaining actual fuel supply weight Gmain through the division of intake air quantity Qair by actual air/fuel ratio AFreal, by obtaining actual specific gravity Gfuel through the division of actual fuel supply weight Gmain by main fuel injection quantity (fuel supply quantity) Qmain and by correcting actual specific gravity Gfuel according to fuel temperature TF, the invention is not limited to this method and may employ other methods. For example, actual fuel specific gravity γreal may be obtained by obtaining fuel injection quantity Qmain from fuel injection period Mperiod and common-rail pressure PCR in fuel injection apparatus 10, by obtaining standard fuel injection weight Gmain from fuel injection quantity Qmain, standard fuel specific gravity γstd and fuel temperature TF, by obtaining standard air/fuel ratio AFstd from standard fuel injection weight Gmain, air weight Gair detected by airflow meter 7, and by comparing standard air/fuel ratio AFstd and actual air/fuel ratio AFreal.

Although the embodiment according to the present invention has been shown and described as to a case of employing a diesel engine, the control of the combustion control system according to the present invention is applicable to a gasoline engine by replacing the injection timing control executed at step S410 with an ignition timing control for a gasoline engine. Such an ignition timing control for a gasoline engine will be discussed hereinafter.

Figure 16:
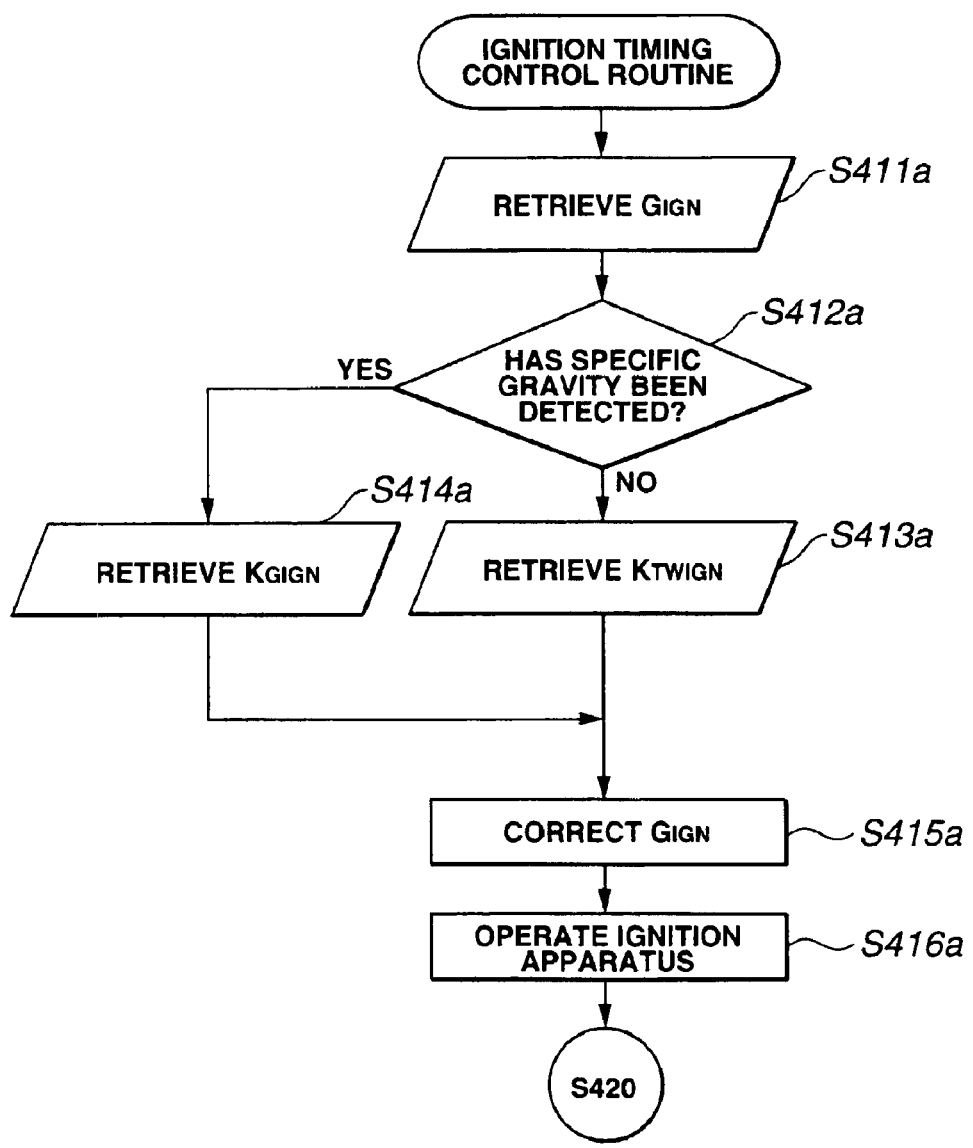
FIG. 16 is a flowchart showing an ignition timing control routine of a gasoline engine.

FIG. 16 shows a subroutine for the ignition timing control for a gasoline engine, which subroutine corresponds to step S410 in FIG. 13.

At step S411a control unit 30 retrieves an ignition timing GIGN functioning as a standard ignition timing from a map which represents a relationship among ignition timing GIGN, engine speed Ne and load while employing engine speed Ne and load L as parameters, and which has been previously stored in ROM of control unit 30.

At step S412a control unit 30 determines whether or not the specific gravity of fuel used in the gasoline engine has been detected. When the determination at step S412a is negative, that is, when the specific gravity of fuel has not been detected, the subroutine proceeds to step S413a wherein control unit 30 retrieves an ignition timing correction coefficient KTWING from a table which represents a relationship between ignition timing correction coefficient KTWING and cooling water temperature Tw while employing cooling water temperature Tw as a parameter, and which has been previously stored in ROM of control unit 30. Ignition timing correction coefficient KTWING has been set such that the ignition timing is advanced as cooling water temperature becomes lower.

At step S415a subsequent to the execution of step S413a, control unit 30 corrects ignition timing correction coefficient GIGN by multiplying ignition timing GIGN by ignition timing correction coefficient KTWIGN (GIGN←GIGN×KTWIGN).

At step S416a control unit 30 operates a ignition apparatus to spark an ignition plug for a cylinder to be fired according to the corrected ignition timing GIGN.

Although the ignition apparatus does not shown in the drawings, the system in case of a gasoline engine is arranged such that control unit 30 controls the ignition timing on the basis of the crank angle signal of crank angle sensor 32 and cylinder distinguish signal Cyl of crank angle sensor 33.

Although the above case has been described such that the correction of the ignition timing relative to the cooling water temperature is executed by multiplying the ignition timing by the correction coefficient, the invention is not limited to this and may be arranged to execute the correction of the ignition timing by obtaining an ignition timing correction value based on the cooling water temperature and by adding the ignition timing correction value to standard ignition timing GIGN.

Figure 10:
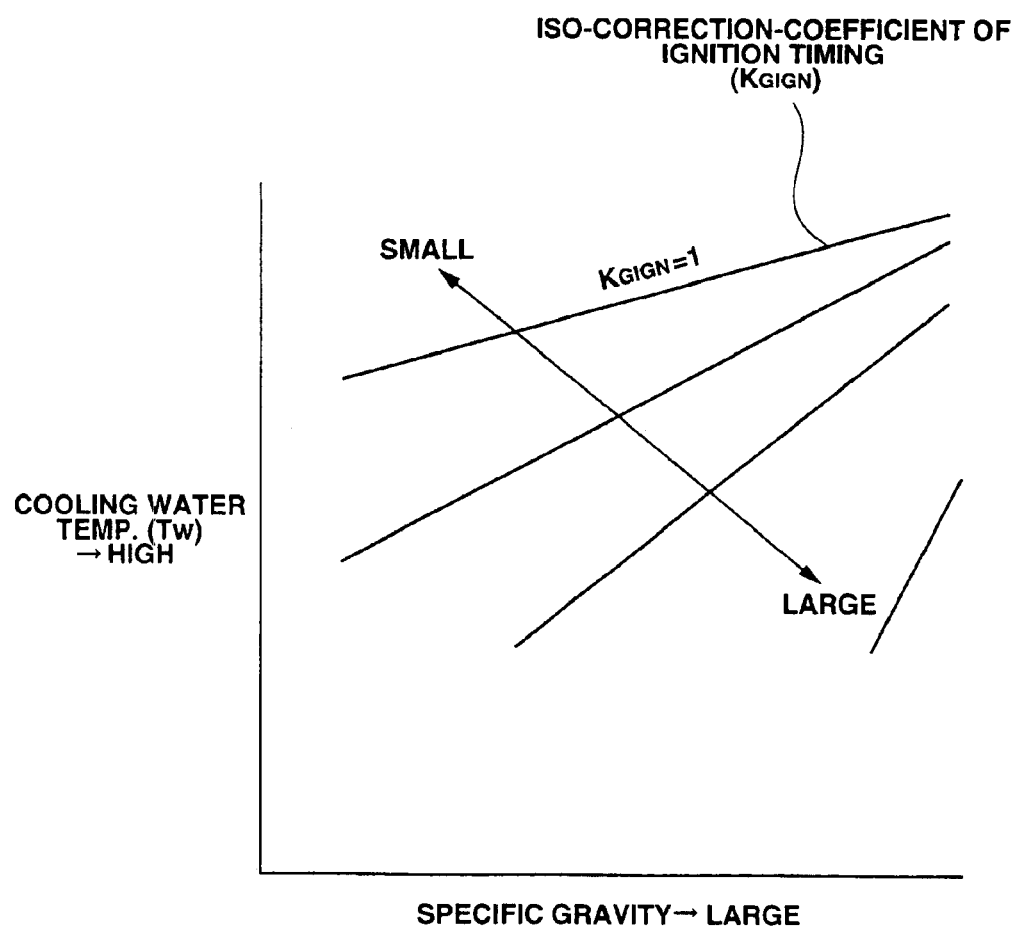
FIG. 10 is a graph showing a relationship among an ignition timing correction coefficient, a specific gravity of gasoline and the cooling water temperature.

On the other hand, when the determination at step S412a is affirmative, that is, when the specific gravity of fuel has been detected, the subroutine in FIG. 16 proceeds to step S414a wherein control unit 30 retrieves an ignition timing correction coefficient KGIGN from a map which represents a relationship among ignition timing correction coefficient KGING, cooling water temperature Tw and specific gravity of fuel while employing cooling water temperature Tw and specific gravity of fuel as parameters, and which has been previously stored in ROM of control unit 30. At step S415a subsequent to the execution of step S414a, control unit 30 corrects ignition timing GIGN by multiplying ignition timing GIGN by ignition timing correction coefficient KGIGN (GIGN←GIGN×KGIGN). Herein, it is preferable that ignition timing correction KGIGN varied according to the cooling water temperature and the specific gravity of fuel is set such that the ignition timing is advanced as the cooling water temperature is lowered and/or as the specific gravity increase, as shown in FIG. 10. By this correction of the ignition timing, an engine starting performance is improved, and the fuel consumption and the emission particularly at HC during engine warm-up condition are improved.

With the thus arranged combustion control system of the gasoline engine in accordance with the present invention, the following advantages are derived.

(1) By advancing the ignition timing as the specific gravity of fuel becomes larger, it becomes possible to suitably control the ignition timing according to the octane number. When the octane number becomes larger as the specific gravity of fuel becomes larger, knocking resisting performance of the engine is improved. Since the generation of knocking is suppressed even when the ignition timing is advanced, it becomes possible to improve the fuel consumption by correcting the ignition timing to an advanced side when the engine is operating at a partial load condition.

(2) Since the embodiment according to the present invention achieves the ignition timing control adapted to the fuel property while commonly employing sensors and functions of the diesel engine, the production cost of this system according to the present invention is largely suppressed.

Although the embodiment according to the present invention has been shown and described such that the cooling water temperature Tw as a representative engine temperature is detected by water temperature sensor 31, other temperature such as a lubrication oil temperature or combustion chamber temperature may be detected as an engine temperature.

This application is based on Japanese Patent Application No. 2003-31833 filed on Feb. 10, 2003 in Japan. The entire contents of this Japanese Patent Application are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A combustion control system of an internal combustion engine comprising:

a specific gravity detecting section which detects a specific gravity of fuel used in the engine;

a combustion control section which controls combustion in the engine on the basis of the specific gravity; and a temperature detecting section which detects an engine temperature indicative value; an engine speed detecting section which detects an engine speed; a load detecting section which detects a load of the engine; and a fuel injection apparatus;

wherein the combustion control section controls a fuel injection timing of the fuel injection apparatus by obtaining a standard fuel injection timing from a map indicative of a relationship among the standard fuel injection timing, the engine speed and the load, by obtaining one of a correction value and a correction coefficient of the fuel injection timing on the basis of the engine temperature indicative value and the specific gravity, and by correcting the standard fuel injection timing by one of the correction value and the correction coefficient.

2. The combustion control system as claimed in claim 1, wherein one of the correction value and the correction coefficient for the fuel injection timing is obtained from a map indicative of a relationship among the engine temperature indicative value, the specific gravity of fuel and one of the correction value and the correction coefficient.

3. The combustion control system as claimed in claim 1, wherein the fuel injection timing is advanced as the engine temperature indicative value becomes lower or as the specific gravity becomes greater.

4. The combustion control system as claimed in claim 1, wherein the temperature detecting section, the engine speed detecting section, the load detecting section and the fuel injection apparatus are for a diesel engine.

5. The combustion control system as claimed in claim 1, wherein the temperature detecting section detects at least one of a cooling water temperature, a lubrication oil temperature and a combustion chamber temperature of the engine as the engine temperature indicative value.

6. A combustion control system of an internal combustion engine comprising:
- a specific gravity detecting section which detects a specific gravity of fuel used in the engine;
- a combustion control section which controls combustion in the engine on the basis of the specific gravity;
- a temperature detecting section which detects an engine temperature indicative value, a lubrication oil temperature, and a combustion chamber temperature as a temperature of the engine;
- an engine speed detecting section which detects a revolution speed of the engine;
- a load detecting section which detects a load of the engine; and
- an exhaust gas recirculation (EGR) apparatus;
- wherein the combustion control section controls the quantity of EGR via the EGR apparatus by obtaining a standard EGR control signal from a map which represents a relationship among the standard EGR control signal, the engine speed and the load, by obtaining one of an EGR correction value and an EGR correction coefficient from a map which represents a relationship among the engine temperature, the actual specific gravity and one of the EGR correction value and the EGR correction coefficient, and by correcting the standard EGR control signal by one of the EGR correction value and the EGR correction coefficient.

7. The combustion control system as claimed in claim 6, wherein the quantity of EGR is decreased as the engine temperature becomes lower or as the specific gravity of fuel becomes greater.

8. A combustion control system of an internal combustion engine comprising:
- a specific gravity detecting section which detects a specific gravity of fuel used in the engine;
- a combustion control section which controls combustion in the engine on the basis of the specific gravity;
- a temperature detecting section which detects an engine temperature indicative value;
- an engine speed detecting section which detects a revolution speed of the engine;
- a load detecting section which detects a load of the engine; and
- an ignition apparatus;
- wherein the combustion control section controls the ignition timing of the ignition apparatus by obtaining a standard ignition timing from a map indicative of a relationship among the standard ignition timing, the engine speed and the load, by obtaining one of a correction value and a correction coefficient of the ignition timing on the basis of the engine temperature and the specific gravity, and by correcting the standard ignition timing by one of the correction value and the correction coefficient.

9. The combustion control system as claimed in claim 8, wherein the ignition timing is advanced as the engine temperature indicative value becomes lower or as the specific gravity of fuel becomes higher.

10. A combustion control system of an internal combustion engine comprising:
- a specific gravity detecting section which detects a specific gravity of fuel used in the engine;
- a combustion control section which controls combustion in the engine on the basis of the specific gravity; and
- wherein the specific gravity detecting section comprises first means for obtaining a fuel injection quantity from the fuel injection period and the injection pressure of the engine, second means for obtaining a standard fuel injection weight from the fuel injection quantity, a preset standard specific gravity and a fuel temperature, third means for obtaining a standard air/fuel ratio from the standard fuel injection weight and an air weight detected by an airflow meter, and fourth means for obtaining an actual fuel specific gravity by comparing the standard air/fuel ratio and an actual air/fuel ratio detected by an air/fuel sensor.

* * * * *